United States Patent [19]

Sikes et al.

[11] Patent Number: 5,057,590

[45] Date of Patent: Oct. 15, 1991

[54] BISLACTONE CURING AGENTS FOR EPOXY RESINS AND POLYMERS OBTAINED THEREFROM

[75] Inventors: Allison M. Sikes, Chantilly, Va.; Robert F. Brady, Jr., Gaithersburg, Md.

[73] Assignee: The United States of America as represented by the Secretary of the Navy, Washington, D.C.

[21] Appl. No.: 500,839

[22] Filed: Mar. 29, 1990

[51] Int. Cl.$^5$ .................... C08G 59/16; C08G 59/42
[52] U.S. Cl. .................................... 528/116; 528/93; 528/354; 549/344
[58] Field of Search ............... 528/116, 354; 549/344

[56] References Cited

U.S. PATENT DOCUMENTS

| | | | |
|---|---|---|---|
| 3,294,743 | 12/1966 | Mack | 528/116 |
| 4,379,138 | 4/1983 | Pitt et al. | 528/354 X |
| 4,492,789 | 1/1985 | Nakashima et al. | 528/116 X |
| 4,507,460 | 3/1985 | Kikuchi et al. | 528/116 X |
| 4,943,610 | 7/1990 | Sayles | 528/354 X |

*Primary Examiner*—John Kight, III
*Assistant Examiner*—Frederick Krass
*Attorney, Agent, or Firm*—Thomas E. McDonnell; Barry A. Edelberg

[57] ABSTRACT

Bislactone curing agents are used to cure and copolymerize with epoxy-based resins. Preferably, the copolymerization is performed using a tertiary amine catalyst. During cure, the bislactone ring opens and expands. The use of bislactones as curing agents for epoxy-based resins avoids the shrinkage and accompanying stresses which occur when epoxy-based resins are cured conventionally. The novel bislactone cured epoxy-based polymers according the present invention are less prone to failure than are conventional epoxy-based polymers. In a further embodiment, the epoxy is copolymerized with a novel bislactone monomer having at least one trifluoromethyl group. The resulting fluorinated copolymer has a reduced surface energy.

18 Claims, 4 Drawing Sheets

BISLACTONE CURING AGENTS FOR EPOXY RESINS AND POLYMERS OBTAINED THEREFROM

BACKGROUND OF THE INVENTION

1. Field of the Invention

The present invention relates generally to epoxy-based resins and more specifically to epoxy based resins having little shrinkage or stress upon curing.

2. Description of the Prior Art

The formation of polymers from epoxy resins is accompanied by a reduction in the volume of the reactants. This shrinkage is unavoidably created when atoms which are separated from one another as monomers by the sum of their van der Waals radii come together to assume a covalent bond distance in polymers. This shrinkage creates internal strain in the resin, and may cause it to pull away from reinforcing fibers, fillers, or its substrate, thus creating loss of adhesion and voids or channels for the penetration of foreign and potentially destructive substances. Shrinkage creates internal strain and diminishes the mechanical properties of resins. The resulting loss in performance becomes especially important for resins designed for exposure at high temperature, or for cycling between low and high temperatures.

Polymerization which proceeds via cationic and free-radical mechanisms with some net expansion was discovered by William J. Bailey [See for example W. J. Bailey in Ring-Opening Polymerizations, J. E. McGrath, Ed., ACS Symposium Series 286, pp. 47-65, American Chemical Society, Washington, D.C., 1985.] Anionic polymerizations with expansion were discovered by Brady and Simon [Journal of Polymer Science, Polymer Chemistry Edition, 25, 231-239 (1988)], but the monomers they used have useful lives measured in weeks, and are not practical materials in a manufacturing environment.

The use of acid anhydrides to cure epoxy resins is well known. [See Lee and Neville, Handbook of Epoxy Resins, Chapter 23, McGraw Hill, N.Y., 1967.] Customarily, a mixture of an epoxy resin and an anhydride is cured at 120° to 130° C., with or without a catalyst, for 20 to 24 hours. Sublimation of the anhydride at curing temperatures, and crystallization of the anhydride from the epoxy resin at room temperature are obstacles to the convenient use of anhydrides.

SUMMARY OF THE INVENTION

Accordingly, it is an object of the present invention to reduce shrinkage and stress during curing in epoxy based resin mixtures.

It is another object of the present invention to provide an epoxy-based polymer having superior thermal properties.

It is yet another object of the present invention to produce an epoxy-based resin particularly useful in composites, coatings and other materials subjected to thermal cycling or high temperatures.

It is a further object of the present invention, in at least one embodiment, to produce bis(bislactones) for curing epoxy resins.

These and other objects are accomplished by curing epoxy-based resins with bislactone monomers. During polymerization, the bislactone ring opens and expands. This expansion compensates for the loss in volume which occurs as the association between the reactants changes from attraction by virtue of Van Der Waal's forces to covalent bonding. The bislactone monomers are stable, and when copolymerized with epoxy monomers, provide a strong polymer useful in a material subjected to thermal cycling or high temperatures.

Bislactones may be considered to be similar to anhydrides in that they are formed from a diacid by loss of water, but they differ from anhydrides in that a carbonyl group in the same molecule is involved in the dehydration reaction. At baking temperatures for epoxy resins, bislactones are effective curing agents. During the curing reaction, bonds in the lactone rings break, and atoms once joined together move apart, creating some expansion in volume. This reaction process helps impart the beneficial properties to the polymeric products. Especially useful copolymers can be produced by curing the epoxy resins with novel bis(bislactones).

DETAILED DESCRIPTION OF THE INVENTION

Figure 1:
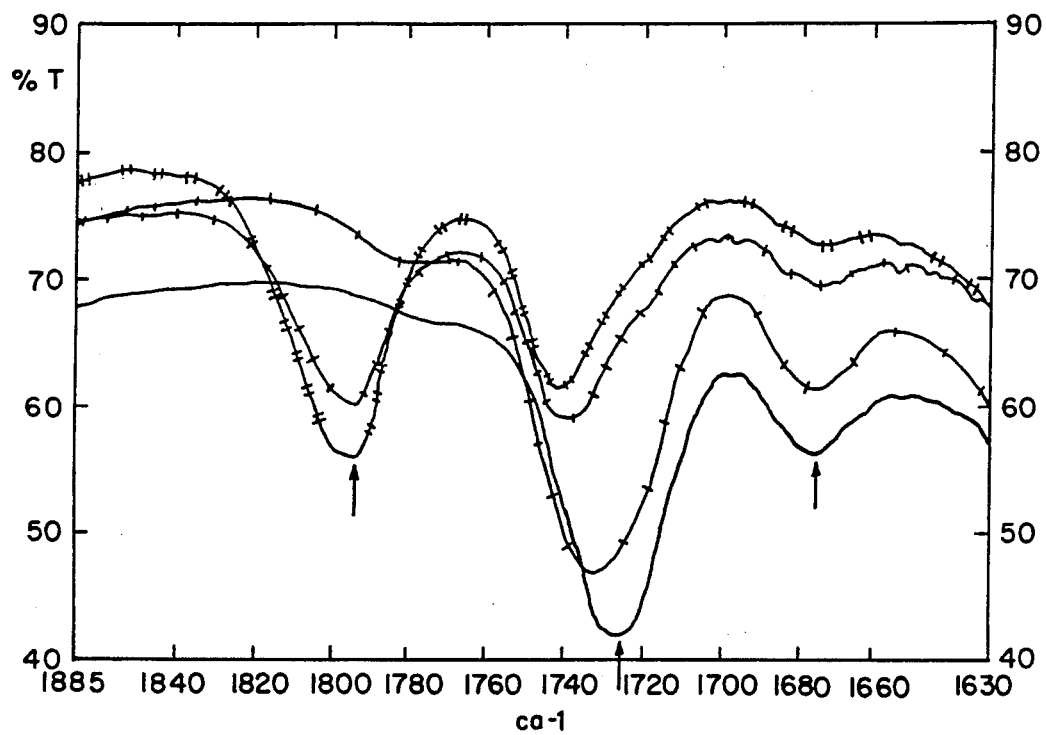
FIG. 1 is a room temperature FTIR spectra of DGEBA containing 7% ECA and cured 1 hour (-++-) 6.5 hours (-+-) 90 hours (-+-) and 200+ hours (—). Arrows point to the decreasing bislactone band and to increasing ester and ketone bands.

Bislactone monomers useful according to the present invention have the following formula:

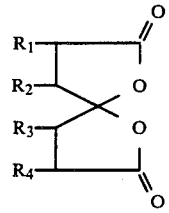

where $R_1$–$R_4$ may be, independently of each other or in any combination with each other to form a divalent or higher radical: H or any organic radical lacking a functional group, other than one or more bislactone moieties, that reacts with the epoxy to be copolymerized with the bislactone. For example, $R_1$–$R_4$ can each independently of the other be H, aryl (halogenated or not), aryloxy (halogenated or not), alkyl (halogenated or not), aryloxy (halogenated or not) or $R_1$ and $R_2$ and/or $R_3$ and $R_4$ can combine to form arylene (halogenated or not) or alkylene (halogenated or not). The nature of $R_1$–$R_4$ is not critical to the present invention provided that, with the exception of being another bislactone, they do not react with the epoxy to be copolymerized and cured with the bislactone and provided that the bislactone is miscible with the epoxy at practical copolymerization temperatures. In general, however, the choice of $R_1$–$R_4$ should have little effect on the reactivity of the bislactone because of their distance from the reactive site thereof. The influence of the selection of $R_1$–$R_4$ on the properties of the final products can be predicted based on the influence which those functional groups exhibit in analogous polymers produced by the reaction of acid anhydrides with epoxy resins.

One embodiment of the present invention is especially useful for the preparation of epoxy-based materials. In this embodiment, $R_3$ and $R_4$ combine to form:

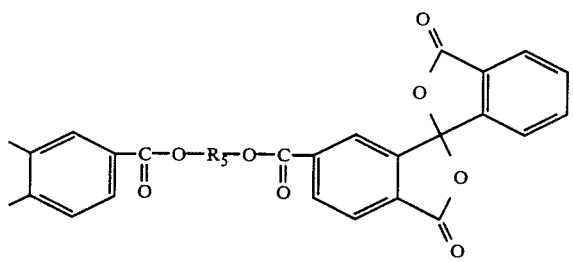

where $R_5$ is a divalent organic radical which may contain one or more fluoroalkyl or pefluoroalkyl groups. Examples of suitable selections for $R_5$ include, but are not limited to:

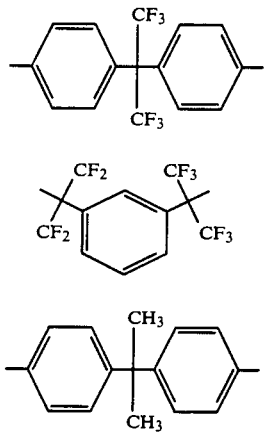

Addition of one or more fluoroalkyl groups, such as perfluoroalkyl, especially trifluoromethyl, to a polymer is an effective and frequently exploited method to reduce its surface energy. The surface energy for $sp^3$ carbon fragments decreases in the series —$CH_2$—>—$CH_3$—>—$CF_2$—>—$CF_3$—; in fact, the surface having the lowest energy ever found, 6 mN/m$^2$, consists of closely-packed —$CF_3$ groups.

The epoxy to be copolymerized and cured by reaction with the bislactone has the following formula:

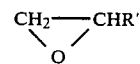

where $R'$ can be any organic radical lacking a functional group, other than one or more epoxide moieties, that reacts with the bislactone to be polymerized therewith, and which provides an epoxy which is miscible with the bislactone at practical copolymerization temperatures. For example, $R'$ can be aryl (halogenated or not), aryloxy (halogenated or not), alkyl (halogenated or not) or alkoxy (halogenated or not). In general, as with the $R_1$–$R_4$ groups of the bislactone, the selection of $R'$ is not critical to the present invention and $R'$ may therefore be selected in accordance with the properties desired in the final polymer, i.e., the epoxy copolymerized with the bislactone can be any epoxy conventionally copolymerized with acid anhydrides, with analogous influences resulting from the choice of $R'$.

In a catalyzed reaction, the bislactone reacts with the epoxy according to the following reaction scheme:

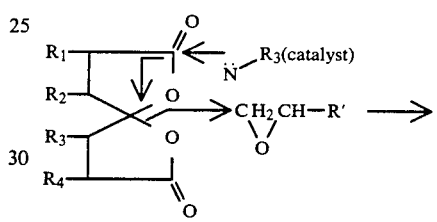

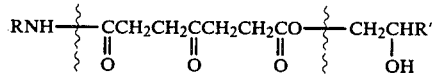

The ring-opening reaction is initiated by nucleophilic attack at a carbonyl carbon in the bislactone. The formation of a new C—O bond leads to the cleavage of a C—O bond in each ring, and the bicyclic monomer is thus converted to a straight chain moiety in the new polymer. The reaction is thermodynamically favored because it relieves steric and dipole strains at the spiro carbon and allows the bislactone moiety to assume a more extended conformation in the polymer. The polymer obtained from 3, 3'-spirobiphthalide (SBP) and the diglycidyl ether of bisphenol (DGEBA) contains the thermally stable 2,2'-oxycarbonyl benzophenone linkage which introduces aromatic rings, ester and keto groups in the backbone of the polymer.

The bislactone and epoxy are copolymerized, preferably in the presence of an appropriate catalyst such as a tertiary amine. Any tertiary amine commonly used as a catalyst for the copolymerization of acid anhydrides with epoxy resins may be used. Preferred tertiary amines are tris(dimethylaminomethyl)phenol, benzyldimethylamine, 1,4-diazobicyclo(2.2.2)octane, 4-dimethylaminopyridine, N-methylmorpholine, and similar compounds. The effective amounts of tertiary amines are typically 0.1 to 20 parts amine per 100 parts (by weight) of resins (bislactone and epoxy together). The optimum amounts of tertiary amines are 1 to 5 parts per hundred resin, for amounts in this range produce optimum properties in the cured polymer. These amounts of catalyst correspond to the amounts which are used for anhydride-cured epoxies. One commonly used tertiary amine catalyst useful in the present invention is tris-dimethylaminomethyl phenol, referred to as "tris".

The copolymerization is generally performed neat. For the copolymerization, the bislactone, epoxy and, optionally, the catalyst, are mixed, typically within a mold, in appropriate amounts at elevated temperatures to decrease the viscosity and increase the miscibility of the reactants. Preferably, this elevated temperature is about 40°–70° C. The reactants are heated to polymerization temperatures, preferably about 90°–150° C., and most preferably 120°–130° C., and maintained within a mold at polymerization temperature until the liquid reaction mixture solidifies. Usually, the desired degree of solidification occurs in about 4 to 24 hours.

The hardened reaction mixture is then removed from the mold and postcured at a higher temperature to complete the reaction to the extent needed to obtain the desired degree of crosslinking, which determines the toughness and brittleness of the final product. Typically, postcuring is done at about 125°–225° C. for about 4–24 hours. Postcuring can be done in either a single step or in stages. Postcuring in stages, e.g., 4 hours at 150° C., 4 hours at 175° C. and 4 hours at 200° C. forms large molecules in the initial stages. In the later stages, at higher temperatures, these large molecules crosslink. The initial formation of large molecules permits the eventual formation of a highly crosslinked polymer before brittleness results. The high degree of crosslinking enhances the toughness of the final postcured product.

Advanced composites or pigmented compositions can be formed by including fibers and/or fillers in the copolymerization reaction mixture. Suitable fillers are those conventionally useful as fillers in polymers. Such fillers include, but are not limited to, iron oxide, calcium carbonate, magnesium silicate, talc, clay, barium sulfate, zinc oxide, zinc phosphate, and silicon dioxide. Of course, fillers may also serve as pigments. Suitable reinforcing fibers are those conventionally used for reinforcing polymers. Such fibers include, but are not limited to carbon fibers, glass fibers, polyester fibers, Nylon TM and other polyamide fibers and acrylic fibers.

The ratio of bislactone to epoxy (which is reflected in the weight percents of each based on the total weight of the bislactone and epoxy) in the reaction mixture can influence the properties of the final product. Solutions of up to 15 weight percent (based on the total weight of the bislactone and epoxy) of a bislactone in an epoxy monomer or prepolymer have been shown to be essentially stable for months at room temperature. Solutions containing larger amounts of bislactone (from about 15 to about 25 weight percent or perhaps even higher) may also be have a useful stability to storage at room temperature. At low ratios of bislactone to epoxy (about 1 to 4 weight percent), the properties of the copolymer will most likely differ little from those of the epoxy homopolymer. Improved mechanical properties and thermal stability over the epoxy homopolymer generally become apparent when reaction mixtures containing more than about 4 weight percent bislactone are copolymerized. The improvement in mechanical and thermal properties typically reaches a plateau at about 13 to 15 weight percent. Nevertheless, the ratios discussed in this paragraph are based upon data derived from samples prepared according to the general method and demonstrations in the Examples. The optimum ratio of bislactone to epoxy may differ somewhat for reaction mixtures other than those specifically studied below. In any event, those Examples can provide guidance to the selection of optimum ratios when other bislactones and/or epoxies are to be copolymerized.

Having described the invention, the following examples are given to illustrate specific applications of the invention including the best mode now known to perform the invention. These specific examples are not intended to limit the scope of the invention described in this application.

EXAMPLES

EXAMPLE 1

Thermal properties of epoxies cured by aromatic diols endcapped with spirobislactones Materials. Starting materials (Aldrich, Fluka) were the purest available from the manufacturer (98% or above) and were used as obtained. Solvents were dried over 4 Å molecular sieves. The diglycidyl ether of bisphenol A (DGEBA) (Epon 828) was obtained from Shell and had a degree of polymerization of about 0.2.

Methods. Thermal analysis of materials was performed using a DuPont model 2100 Thermal Analyst with model 910 Differential Scanning Calorimetry (DSC), 951 Thermal Gravimetric Analysis (TGA), and 982 Dynamic Mechanical Analysis (DMA) modules. DSC scans were recorded for bulk samples at heating rates of 10° C./min. TGA scans were at 10° C./min using powdered materials. DMA measurements were made at 2.5° C./min on cast materials (length corrections were performed for each sample prior to runs). The reaction of mixtures between salt plates was monitored with a Perkin-Elmer model 1800 Fourier Transform Infrared Spectrometer (FTIR) operated in the double beam mode with resolution of 2 cm$^{-1}$.

Monomers. The spirobislactone endcapping group, 4-carboxy-7,7'-dioxa-2,2'-spirobi(benzo[c]tetrahydrofuran) 5,was synthesized using a three-step procedure. Phthalic anhydride (PA) 1 was reacted with p-xylene 2 in the presence of AlCl$_3$ to produce

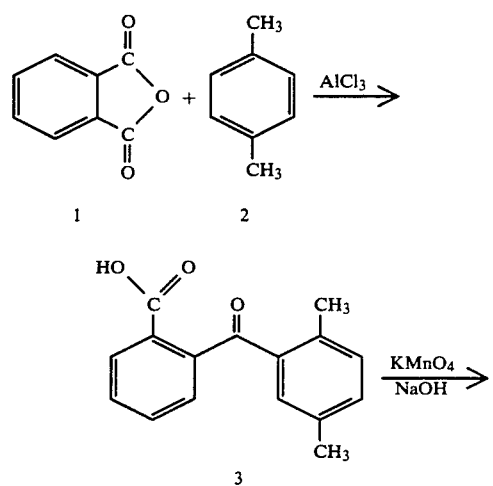

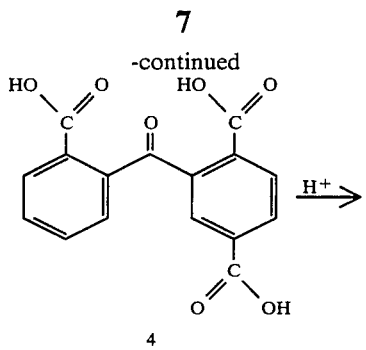

4

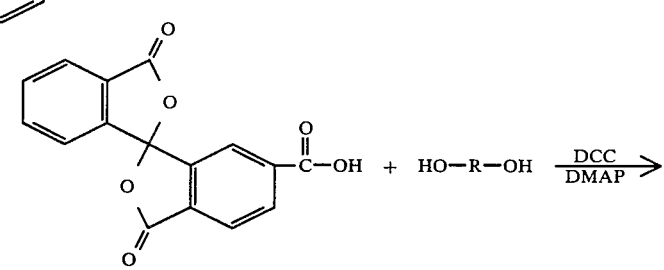

5

2,5-dimethyl-2'-carboxybenzophenone 3. Oxidation by potassium permanganate yielded the triacid 4 which was cyclized to 5 by refluxing with Dowex 50X8-100 resin (H+) in 2-methoxyethyl ether and removing the water of reaction.

The spirobislactone carboxylic acid 5 (2.2 molar eq) was reacted at room temperature with various aromatic diols using dicyclohexyl carbodiimide (DCC) as the coupling agent and 4-dimethylaminopyridine (DMAP) to prevent side reactions, and bislactone endcapped monomers were produced (Scheme II). Endcapped bisphenol A 6 (ECA) was produced from 2,2-bis(4-hydroxyphenyl)-propane; endcapped tetramethylbenzene dimethanol 7 (ECTMB) was produced from 1,4-bis(2-hydroxy-2-propyl)benzene, and endcapped hydroquinone 8 (ECHQ) was produced from hydroquinone. The reaction of resorcinol was also attempted, but complete reaction of both hydroxyl groups was found to be difficult to achieve because of steric hindrance.

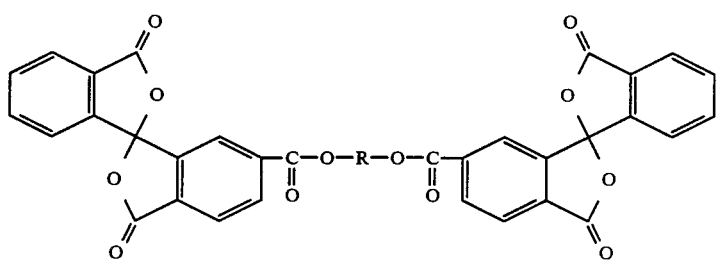

6
7
8

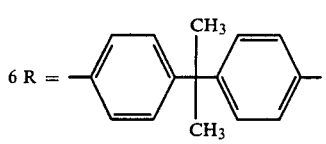

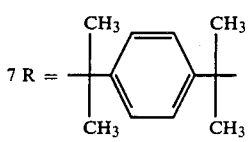

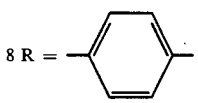

Polymers. Polymerizations were carried out using standard anhydride-epoxy polymerization procedures as described earlier in Sikes et al, Polymeric Materials: Science and Engineering, 60, 614 (1989), incorporated herein by reference. DGEBA was degassed at room temperature than heated to 120° C., held for 5 minutes, and cooled to 60° C. A finely-powdered bislactone comonomer was added, and the mixture was warmed as required to dissolve the comonomer completely. The mixed resin was cooled to room temperature and tris-(dimethylaminomethyl)phenol catalyst was added. The material was centrifuged 10 minutes at 2200 rpm to remove gases, poured into molds treated with a standard fluorocarbon release agent, and cured in an oven. A typical cure schedule consisted of curing for 18 hours at 130° C., removal of the castings from the mold and post-curing at 155° C. for 4 hours and then at 225° C. for 30 minutes. Cure times and temperatures were optimized using data from DSC runs. Room temperature reactivity was also checked by FTIR and DSC scans.

Infrared Spectroscopy. During the copolymerization of ECA 6, the strong bislactone peak at 1792 cm$^{-1}$ disappeared and new peaks appeared at 1729 cm$^{-1}$ (ester) and 1675 cm$^{-1}$ (diaryl ketone). The existing ester linkage in monomer 6 appeared at 1741 cm$^{-1}$ and was convoluted with the new ester band. In the copolymerization of ECTMB 7, fresh mixtures displayed peaks at 1793 and 1724 cm$^{-1}$; and after being cured, ester and ketone absorptions appeared at 1729 and 1675 cm$^{-1}$, as they did in the ECA reactions. In the case of the third endcapped comonomer, mixtures containing ECHQ 8 were more reactive than other mixtures; reaction began immediately upon addition of the tris catalyst. Reaction mixtures before tris was added showed bands at 1793, 1740, and 1700 cm$^{-1}$. Reaction began immediately upon addition of tris, and during reaction bands were evident at 1793, 1729, and 1675 cm$^{-1}$. Cured materials containing ECHQ also had peaks at 1729 and 1675 cm$^{-1}$.

During the first 6 to 7 hours of reaction, FTIR spectra of ECA polymers cured at room temperature showed a reduction of the initial intensity of the hydroxyl peak at 3500 cm$^{-1}$ and a slight decrease in the height of the bislactone peak at 1793 cm$^{-1}$ (FIG. 1). During the same time the bands at 1740 and 1675 cm$^{-1}$ increased slightly. After 20 hours, the bislactone band decreased, the ester band shifted to 1738 cm$^{-1}$, and hydroxyl and ketone bands increased in intensity. This indicates that the hydroxyl groups in the DGEBA resin react to open the spirobislactone rings first, and later the carboxylate groups created in the first step react to open the epoxide rings. After over 200 hours at room temperature, the bislactone peak has disappeared and the ester peak appeared at 1726 cm$^{-1}$.

Thermal Analysis. DSC of the ECA systems after addition of tris catalyst showed multiple exotherms occurring near 147° and 195° C. The peak at 147° C. was produced by the ring-opening of the bislactone species; this peak did not appear in DSC scans of mixtures which contained no bislactone peak in their FTIR spectrum. A smaller, broader peak around 195° C. was produced by oxirane homopolymerization and by reaction of the carboxylate species produced in the ring-opening step with oxirane rings. The heats of reaction varied with the amount of comonomer present. In materials containing ECTMB, broad peaks occurred at 135° and 185° C. In ECHQ materials, the peaks were sharper and were found at 147° and 201° C.; however, FTIR indicated that the ring-opening reaction had already started. The curing process took longer, however, possibly because of the stiffness of the monomer.

Glass transition temperatures ($T_g$) were measured by DSC. ECA polymers showed $T_g$ values around 120° C., and ECTMB polymers had $T_g$ values around 110° C. The ECHQ polymer had the lowest $T_g$ at 104° C.

DMA scans of materials produced by ECA polymerization showed increasing $T_g$ temperatures with increasing amounts of comonomer. $T_g$ values for spirobislactone systems typically occur between 128° and 138° C. The $T_g$ value of a 7% ECA polymer was 153° C.

TGA scans of copolymers cured by one of the spirobislactones 6, 7, and 8 alone displayed an onset of decomposition around 390° C. $T_{dec}$ of these materials is independent of the amount of comonomer used. In the ECA systems, values increased with increasing amounts of 6 used. A $T_{dec}$ of 392° C. was measured for a polymer containing 7% of ECA. Materials with ECTMB had $T_{dec}$ values near 410° C. Materials cured with ECHQ displayed a $T_{dec}$ near 400° C.

EXAMPLE 2

The reaction of 3,3'-spirobiphthalide and bisphenol A diglycidyl ether and the influence of monomer ratios on the properties of the resulting copolymers The starting materials (Aldrich) were used as received without further purification.

3.3'-Spirobiphthalide (SBP) was prepared by a modification of the procedure described by Vaughn et al in J. Amer. Chem Soc., 76, 1748 (1954), incorporated herein by reference. o-Tolyl magnesium bromide 9, produced from o-bromotoluene and magnesium shavings in diethyl ether solution, was transferred under $N_2$ pressure into a dropping funnel and added slowly to a rapidly-stirred solution of excess phthalic anhydride 1 in 3:1 (vol) benzene:diethyl ether under continuous $N_2$ purge. The mixture was refluxed overnight, cooled and hydrolyzed with ice. The organic layer was separated and extracted with 6 percent aqueous sodium bicarbonate solution, and the extracts were cooled in an ice bath. Ketoacid 10a was precipitated by careful addition of 50% sulfuric acid solution. The raw product was recrystallized from xylene (technical grade) to give an off-white crystalline solid, mp 117°, in 65% yield. 10a was dissolved in 10 percent aqueous sodium hydroxide and heated to reflux to remove xylene as its azeotrope with water. A 4 percent solution of aqueous potassium permanganate was added dropwise. The

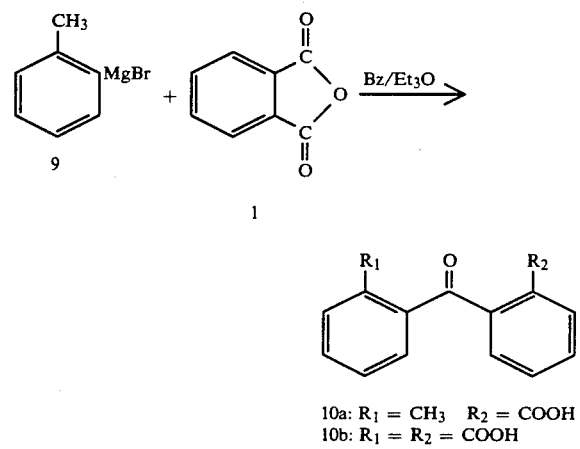

10a: $R_1 = CH_3$  $R_2 = COOH$
10b: $R_1 = R_2 = COOH$

-continued

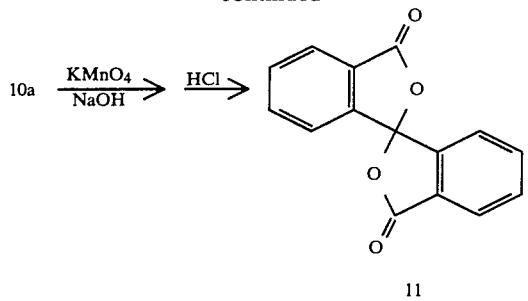

mixture was refluxed overnight, cooled and filtered twice to remove precipitated manganese dioxide. Diacid 10b was not isolated, but the filtrate was acidified with concentrated hydrochloric acid until strongly acidic, and boiled for 2 hours; during boiling, 3,3'-spirobiphthalide 11 precipitated from the solution as a white crystalline material. 11 was isolated in 80% yield by filtration, washed with cold 5 percent sodium bicarbonate solution until the washings were neutral, and washed with water to yield a crystalline solid, mp 212°.

Resins were polymerized as in Example 1. Polymers were characterized as in Example 1.

Reaction mixtures containing from 1 to 15 percent by weight of SBP in DGEBA were studied. Solutions of up to 15 percent of SBP in DGEBA appear to be stable indefinitely at room temperature, and may be easily manipulated to produce products. Mixtures with more than 15 percent of SBP in DGEBA precipitated SBP upon standing at room temperature. Sublimation at curing temperatures and precipitation of the solute below 70° C. do not occur, as is the case when solutions of phthalic anhydride in DGEBA are used. At 1 to 4 percent SBP, cured polymers were very similar to the homopolymer of DGEBA produced by tris catalyst. Changes in polymer properties were apparent at the 5 percent level and reached a constant value at 13–15%. Cured polymers ranged in color from medium yellow (1% SBP) to dark orange (15% SBP).

Figure 2:
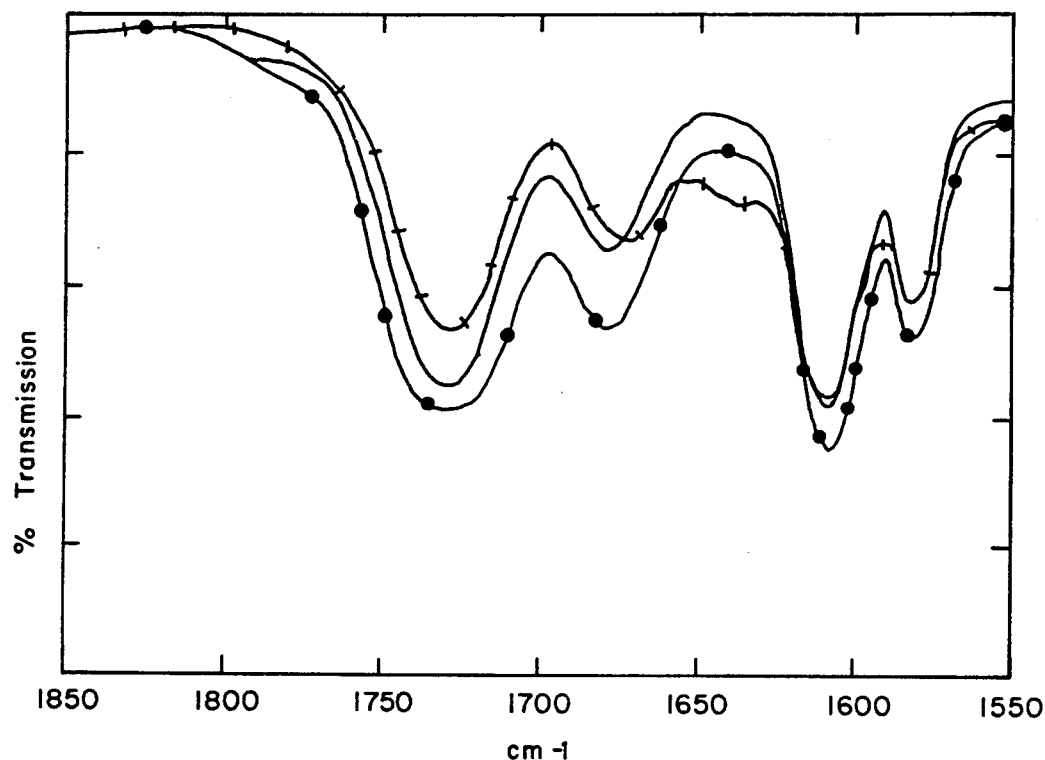
FIG. 2 is a typical FTIR spectra of materials cured with SBP: 5% SBP (+), 9% SBP (—), and 13% SBP (-•-).
Figure 3:
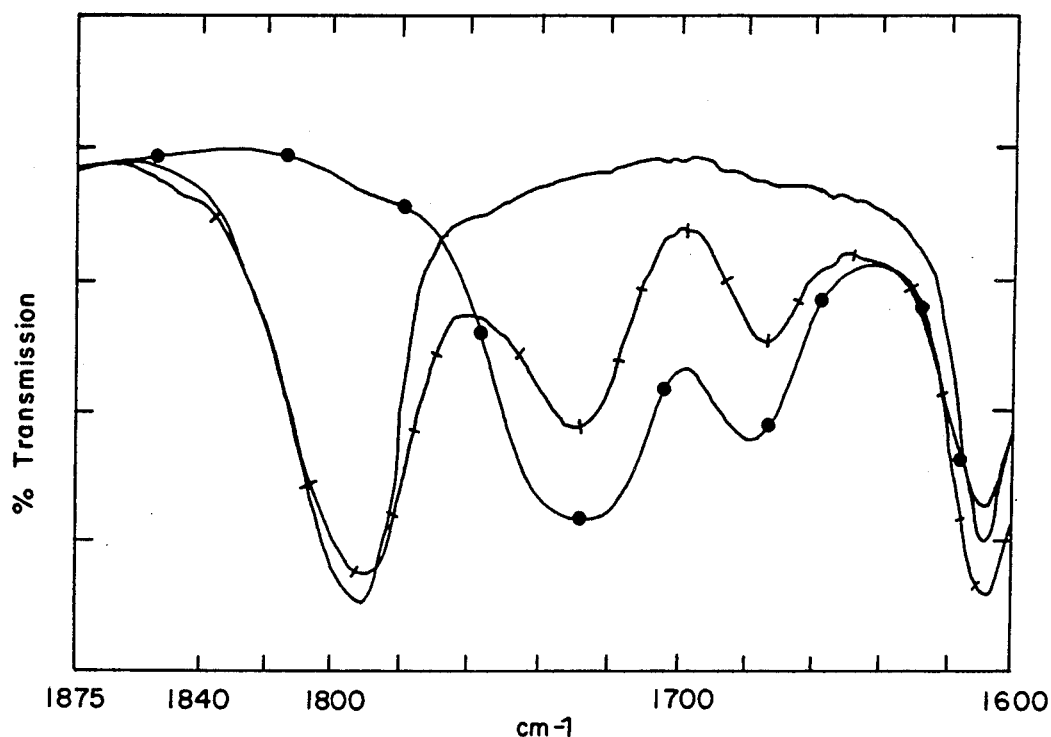
FIG. 3 is a FTIR spectra of a 9% SBP system during cure at room temperature: 30 minutes after tris addition (—), 2 days (-+-), final cured material (-•-).

The progress of the curing reaction was monitored by FTIR. The strong bislactone band at 1790 cm$^{-1}$ disappeared and bands near 1728 cm$^{-1}$ (benzoate ester) and 1677 cm$^{-1}$ (diaryl ketone) formed. In materials with smaller amounts of SBP, a weak band was visible near 1636 cm$^{-1}$ and the ketone band was shifted to 1675 cm$^{-1}$. A benzoate ester band was evident at 1728 cm$^{-1}$ in all cured materials. FIG. 2 shows typical carbonyl band positions and intensities for 5, 9, and 13 percent of SBP in DGEBA. The 9 and 13% systems display only benzoate and ketone bands, whereas in the 5% system the benzoate ester band shifts slightly to 1675 cm$^{-1}$ and an additional band appears at 1636 cm$^{-1}$. The band at 1669 cm$^{-1}$ is obscured by the benzoate ester band, but is responsible for its slight shift. FIG. 3 shows the spectra of a mixture containing 9 percent of SBP after catalyst addition, during cure, and completely cured. Initially, hydroxyl groups in DGEBA react with SBP, opening both rings and forming benzoate ester, diaryl ketone, and carboxylic acid groups. The acid reacts with epoxide rings to generate new hydroxyl groups. The reaction continues in this fashion until the SBP is exhausted. Full cure of the polymer is then attained by tris-catalyzed condensation of the remaining epoxy groups.

Solid state cross-polarized/magic angle spinning (CP/MAS) 1$^{13}$C NMR spectra were obtained for powdered samples using a Bruker MSL 300 NMR spectrometer. The CP/MAS $^{13}$C NMR spectra of cured resins display typical characteristics of cured epoxy resins. Absorption at 44 ppm which is reported to be characteristic of epoxy rings is absent. The carbonyl peaks appear near 175 ppm, bu&: are too poorly resolved to aid in structure determination.

Figure 4:
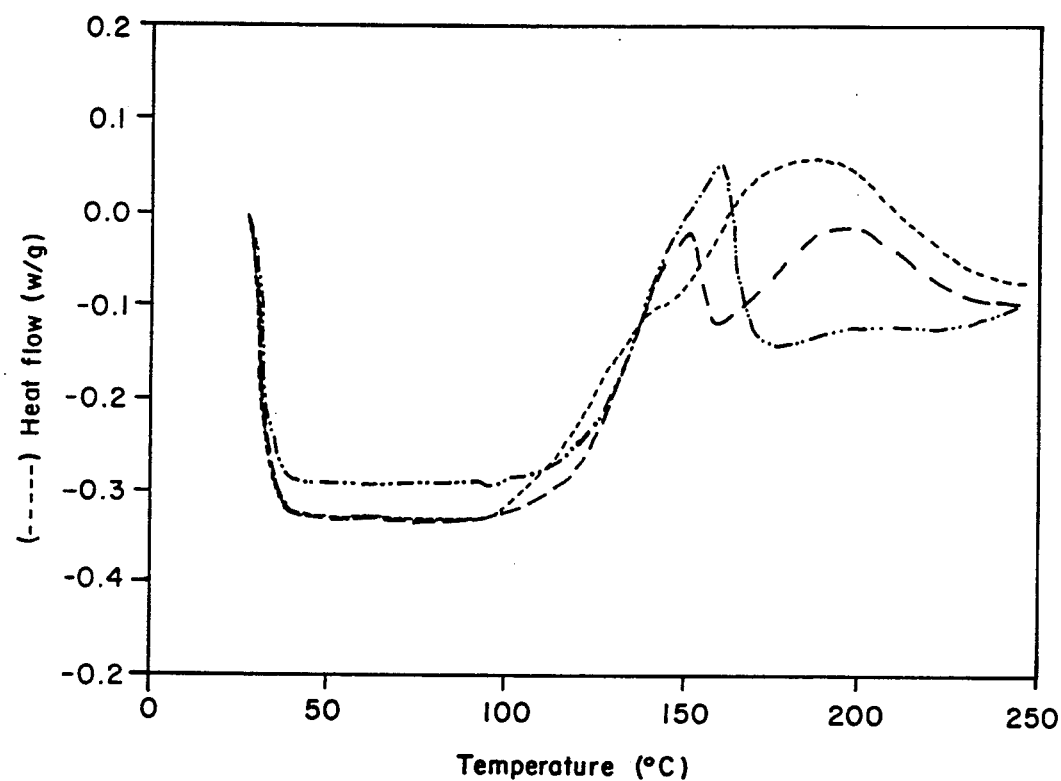
FIG. 4 shows DSC scans of DGEBA:SBP mixtures immediately after addition of tris: 5% SBP (---), 9% SBP (--) and 13% SBP (---).

Differential scanning calorimetry of SBP-DGEBA mixtures after addition of tris catalyst shows multiple exotherms near 150° and 200° C., and the amplitude of the peaks depends on SBP content. The peak near 150° C. is produced by the opening of the bislactone rings; this peak appears only in DSC scans of mixtures which contain bislactone carbonyl absorption in their FTIR spectra. The area of the DSC peak increases with higher amounts of SBP monomer (FIG. 4). The broader peak around 200° C. is produced by epoxy homopolymerization and by esterification of the carboxylic acid produced in the ring-opening step. Heats of reaction for the bislactone ring-opening at 150° C. vary with the amount of SBP present.

The glass transition temperature ($T_g$), measured at the midpoint of the DSC endotherm, typically falls between 110° and 125° C. The measurements are not sensitive enough to reveal a relationship between $T_g$ and the amount of SBP in the mixture. Homopolymers produced with tris alone display $T_g$ values near 105° C., and solutions of PA in DGEBA cured under the same conditions form polymers with $T_g$ values of 160° C.

Thermogravimetric analysis of SBP copolymers show an onset of decomposition ($T_{dec}$) near 380°–400° C., depending on the amount of comonomer used. Polymers with 13 percent of SBP monomer show the highest decomposition temperature, 405° C. Polymers with 15 percent of SBP produce materials with a higher char yield, but their $T_{dec}$ values fall to near 380° C.

Figure 5:
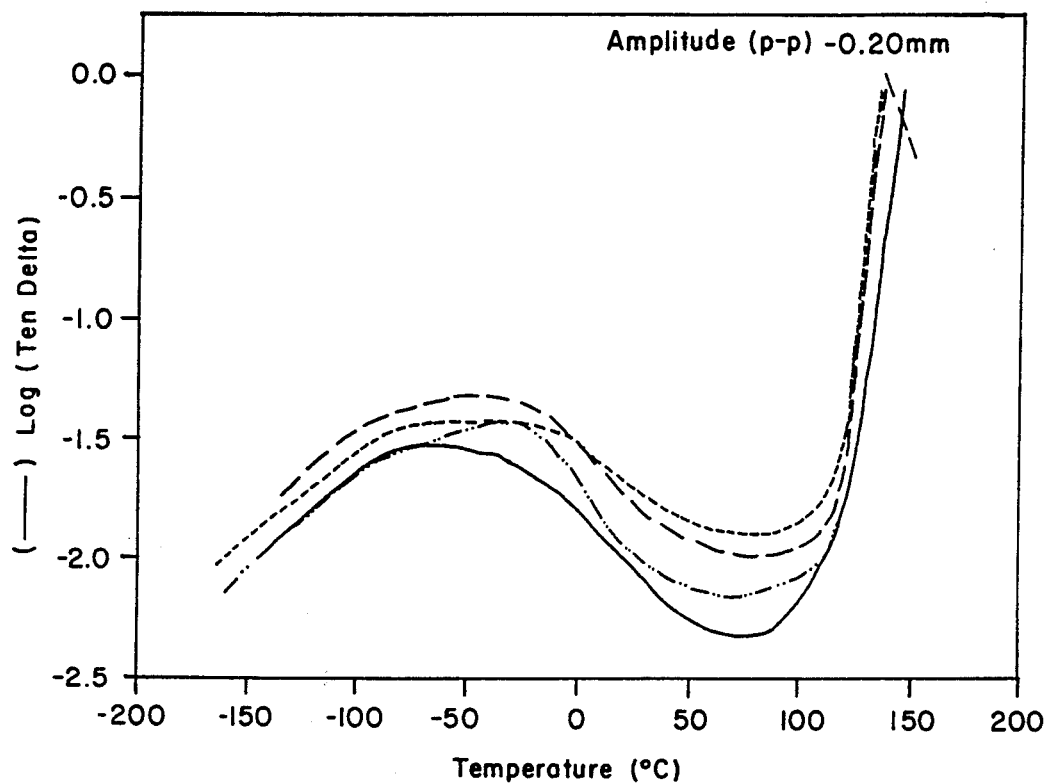
FIG. 5 shows DMA scans of cured SBP samples: 5% SBP (--), 9% SBP (---), 13% SBP (---), and 15% SBP (—).

Dynamic mechanical analysis demonstrates $T_{alpha}$ values in the range of 137° to 147° C.; these values increase with the amount of SBP moiety in the polymer. The broad $T_{beta}$ peak, ranging from $-150°$ to 0° C., can be assigned to the sum of localized mechanical relaxations. Molecular relaxations at $-70°$ C. have been correlated with diester linkages, and those at $-56°$ C. with hydroxyether linkages. In the log (tan delta) plot in FIG. 5, there is a general trend to higher temperatures as the percentage of SBP is decreased. The $T_{beta}$ peak of DGEBA polymerized by tris is near $-40°$ C. A relationship between motion of the polymer backbone and the number of open-chain SBP moieties in the backbone, as measured by the area of the benzoate ester carbonyl absorption in FTIR spectra, could not be established.

Mechanical properties for all SBP copolymers are similar. The yield strength ranged from 80 to 85 MPa, and the initial moduli vary from 1.9 to 2.2 GPa. Polymers containing 13 percent of SBP are at the top of these ranges.

EXAMPLE 3

The reaction of bisphenol A diglycidyl ether with 1,6-dioxaspiro[4,4]nonane-2,7-dione (DSND)

DSND was reacted separately with DGEBA at room temperature (with catalyst) and at 110° C. for 20 to 24 hours (with catalyst). DSND was not soluble in DGEBA at room temperature, but solubility was attained by gently warming the mixture to 40°–50° C.

Catalyzed reactions contained an amount of tris equal to 1% (wt) of all resins.

Reactions were monitored by FTIR. The reaction was followed by the disappearance of the bands at 1787 cm$^{-1}$ (lactone C=O stretch) and 915 cm$^{-1}$ (oxirane ring), and the appearance of bands at 1740 cm$^{-1}$ (ester) and 1715 cm$^{-1}$ (ketone).

DGEBA reacted more rapidly with SBP than with DSND. Infrared spectra showed that the initial reaction involved ring opening of both rings in the bislactone. For DSND reactions at room temperature, no unreacted bislactone remained after 10 to 14 days; at 110° C., reaction times were 40 to 55 minutes. Complete cure (as measured by the disappearance of the oxirane band at 915 cm$^{-1}$) required several weeks at room temperature and 16 to 24 hours at 110° C. Uncatalyzed reactants at 110° C. showed the loss of bislactone bands after 60 to 72 hours; full curing required 7 days.

DSC scans of the reaction mixtures containing DGEBA and catalyst showed exotherms of 120 to 130 Joules per gram near 140° C.

Resins systems were cured in a variety of films and molded forms at both ambient and elevated temperatures in silicone or poly(tetrafluoroethylene) molds of various shapes and sizes. All of the samples were transparent and did not contain voids or nonhomogeneous regions.

EXAMPLE 4

Preparation and use of fluorinated bislactone monomers 4-carboxy-7,7'-dioxo-2,2'-spirobi(benzo[c]-tetrahydrofuran) was synthesized as described in Example 1. 4-carboxy-7,7'-dioxo-2,2'-spirobi (benzo[c]-tetrahydrofuran) (2.2 molar eq) was reacted at room temperature with 2,2-bis(4-hydroxyphenyl)-hexafluoropropane using dicyclohexyl carbodiimide (DCC) as a coupling agent and 4-dimethylaminopyridine as a catalyst to produce the endcapped fluorinated monomer 12 (ECA6F). In a similar manner, the endcapped fluorinated monomer 13

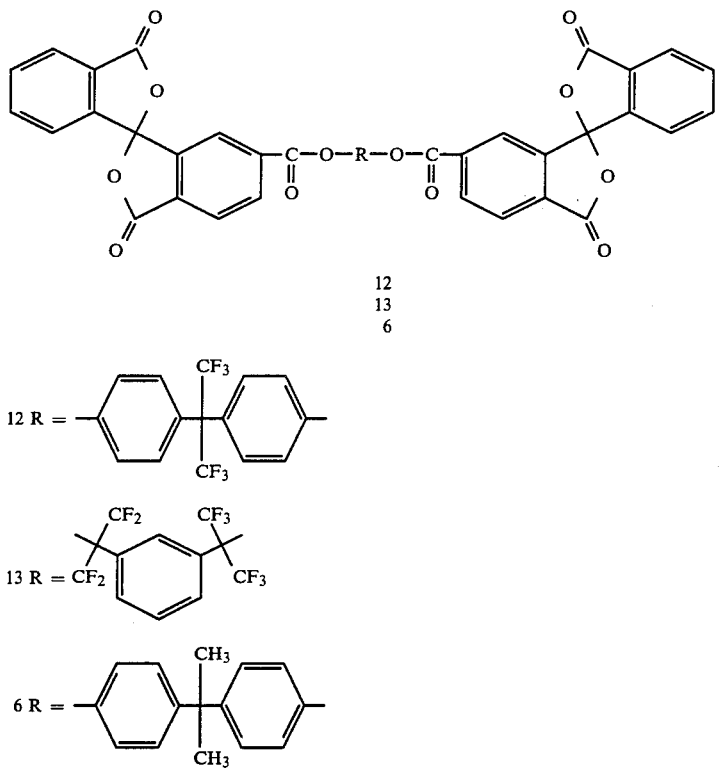

ECBz6F) was produced in the reaction of 4-carboxy-7,7'-dioxo-2,2'-spirobi (benzo[c]-tetrahydrofuran) (2.2 molar eq), DCC,: and 1,3-bis(hexafluoro-2-hydroxyisopropyl) benzene in refluxing tetrahydrofuran. The nonfluorinated monomer 6 (ECA) was produced from 2,2-bis (4-hydroxyphenyl)propane in the same manner as 12 and was used for comparison. The endcapped monomers 6, 12 and 13 contained traces (1-2%) of dicyclohexyl urea which has been reported to be a catalyst for epoxy-anhydride reactions. DGEBA and comonomers were cured using the procedures described in Zisman, Advances in Chemistry Series, 43, 1 (1964), incorporated by reference herein.

Reactions of mixtures between salt plates were followed with a Perkin-Elmer model 1800 FTIR with resolution at 2 cm$^{-1}$. Thermal analysis of samples under N$_2$ was performed using a DuPont model 2100 Thermal Analyst with model 910 DSC, 951 TGA, and 982 DMA modules. DSC and TGA scans were recorded for powdered samples at heating rates of 10° C./min; DMA measurements were made at 2.5° C./min on cast materials (length corrections were performed for each sample). Tensile strength measurements were made on an Instron model 4012 tensiometer at an elongation rate of 2 mm/min. Adhesion measurements were carried out using single carbon fibers (Hercules AS4) embedded in cured resins.

Figure 6:
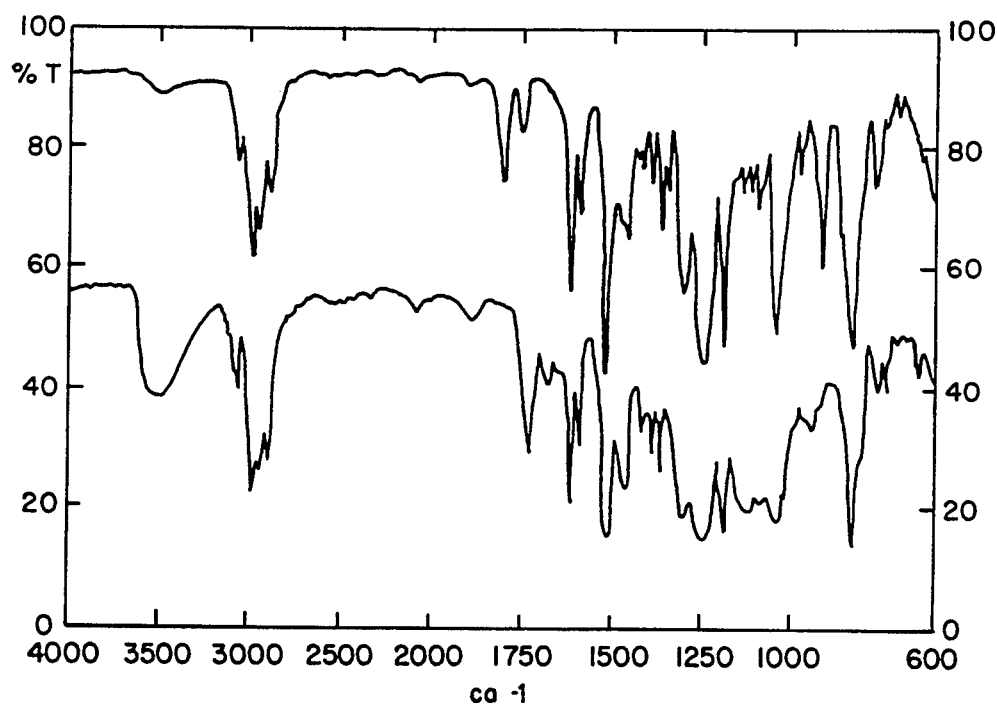
FIG. 6 shows the FTIR spectra of an uncured (upper) and a cured DGEBA:ECA6F system

Spectroscopy. Reactions of resins between salt crystals were followed by FTIR. During polymerization of the ECA6F mixture, the strong bislactone peak at 1793 cm$^{-1}$ disappeared and new bands formed at 1729 cm$^{-1}$ (ester) and 1675 cm$^{-1}$ (diaryl ketone). The benzoate ester peak at 1746 cm$^{-1}$ in the starting material became stronger and shifted to 1729 cm$^{-1}$ as curing progressed, reflecting formation of new ester linkages in the product. The oxirane absorption at 915 cm$^{-1}$ in the starting material was not present in the product, but it was still an important peak at the stage in the cure when the peak at 1793 cm$^{-1}$ had disappeared (FIG. 6). The ECA system had two strong peaks at 1792 cm$^{-1}$ (bislactone) and 1741 cm$^{-1}$ (bislactone ester) in the unreacted resin. After cure, no oxirane bands (915 cm$^{-1}$) were visible and new bands at 1729 and 1675 cm$^{-1}$ were similar to those in cured ECA6F. The uncured ECBz6F resin contained peaks different from those of the other two systems. In addition to the bislactone peak at 1793 cm$^{-1}$, peaks also appear at 1768 and 1735 cm$^{-1}$. In the cured material, peaks appeared at 1729 cm$^{-1}$ (ester) and 1669 cm$^{-1}$ (diaryl ketone).

Figure 7:
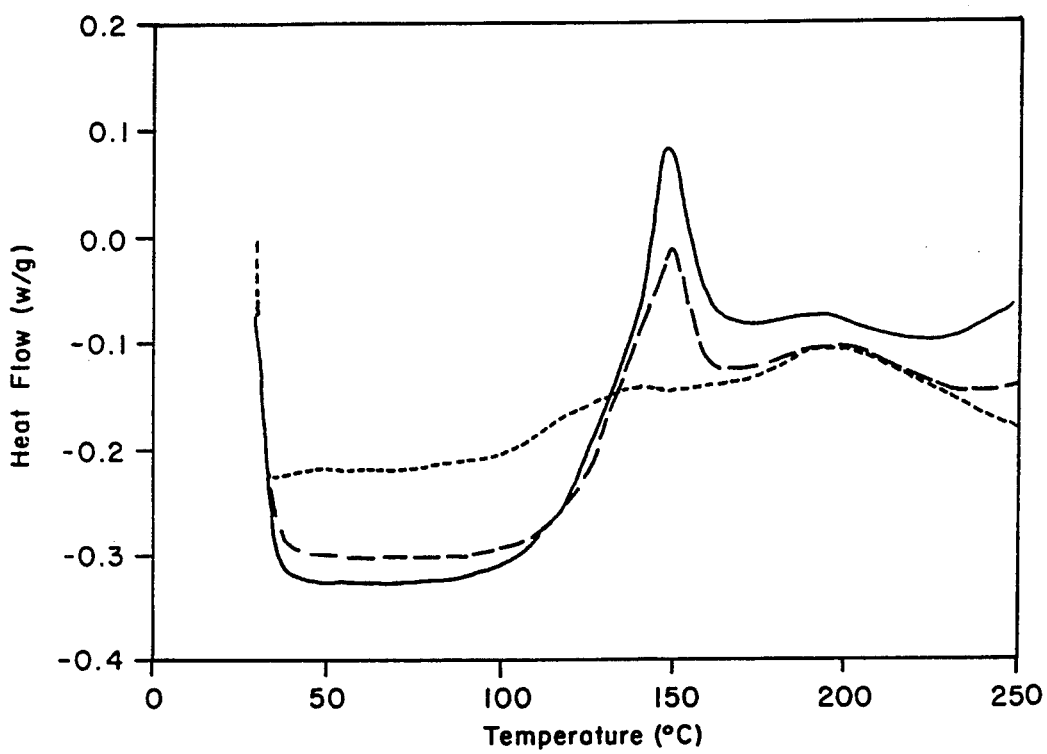
FIG. 7 shows DSC scans of uncured resin: DGEBA:ECA (—), DBEBA:ECA6F (--), and DGEBA:ECBz6F (---).

Thermal Analysis. Differential scanning calorimetry (DSC) of the ECA6F mixture showed exotherms near 150° and 192° C. The peak at 150° C. was produced by the ring-opening of the bislactone species; this peak did not appear in DSC scans of mixtures which contained no bislactone peak in their FTIR spectra. The weaker, broader peak around 192° C. was produced by oxirane homopolymerization and by oxirane reaction with the carboxylic acid produced in the ring-opening step. Heats of reaction for the ECA6F system were slightly less than those of the ECA system. DSC scans of ECBz6F materials showed a very weak peak near 140° C. and a weak peak near 190° C. (FIG. 7). The para-substituted ECA and ECA6F materials show $T_g$ values near 125° C., whereas the meta orientation of the trifluoromethyl groups in 13 lowers the $T_g$ of the ECBz6F material to near 60° C.

The onset of decomposition, $T_{dec}$, for the ECA6F materials is near 390° C., a value similar to that for DGEBA cured with phthalic anhydride. ECBz6F materials have a $T_{dec}$ near 380° C. DGEBA cured with phthalic anhydride has a $T_{dec}$ near 375° C.

Figure 8:
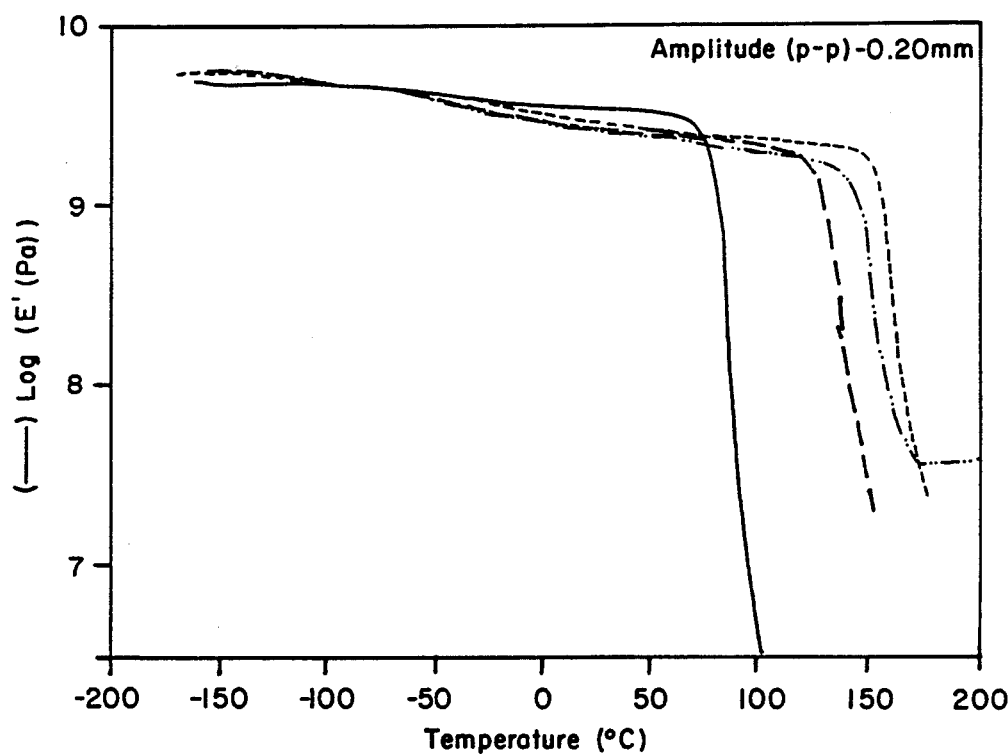
FIG. 8 is a graph of the flexural storage modulus (log E'): DGEBA:ECBz6F (—), DGEBA:ECA6F (--), DGEBA:ECA (---), and DGEBA:PA (---).

Mechanical Properties. DMA scans of ECA6F materials show peaks for mechanical damping near 138° C., lower than those of ECA systems (153° C). ECBz6F materials show $T_{alpha}$ values near 90° C. All materials have broad $T_{beta}$ peaks centered near −70° C. Log flexural storage modulus values (E') (FIG. 8) for the fluorinated materials are similar to those of the phthalic anhydride and ECA materials.

Fluorinated spirobislactone monomers produce polymers with good thermal properties and similar flexural moduli values. As expected, meta substitution of fluorinated groups in the polymer backbone produces materials with lower $T_g$ values than para-substituted systems. Degradation temperatures of bislactone-cured materials are higher than those of phthalic anhydride-cured systems.

Obviously, many modifications and variations of the present invention are possible in light of the above teachings. It is therefore to be understood that, within the scope of the appended claims, the invention may be practiced otherwise than as specifically described.

What is claimed is:

1. A copolymer comprising the reaction product of the copolymerization of a bislactone having the formula:

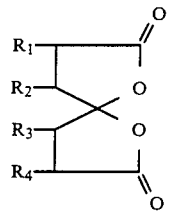

where $R_1$ and $R_2$ may be, independently of each other, or in any combination with each other to form a divalent or higher organic radical: H or any organic radical lacking a functional group, other than one or more bislactone moieties, that reacts with an epoxy resin to be copolymerized with the bislactone, and $R_3$ and $R_4$ combine to form:

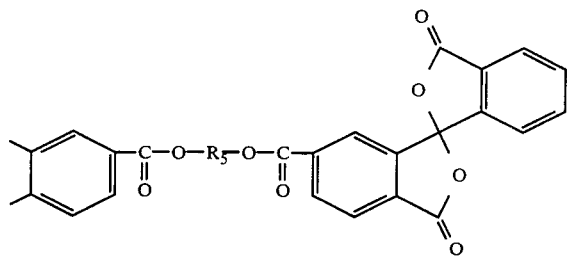

where $R_5$ is a divalent organic radical, with said epoxy resin.

2. A process for polymerizing epoxy resins, comprising heating a liquid reaction mixture comprising a bislactone having the formula:

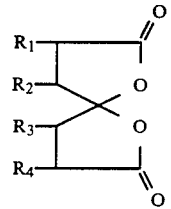

where $R_1$ and $R_2$ may be, independently of each other, or in any combination with each other to form a divalent or higher organic radical: H or any organic radical lacking a functional group, other than one or more bislactone moieties, that reacts with an epoxy resin to be copolymerized with the bislactone, and $R_3$ and $R_4$ combine to form:

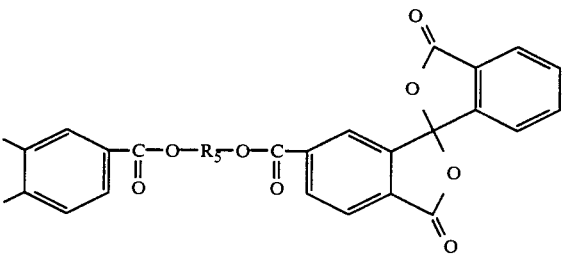

where $R_5$ is a divalent organic radical, with said epoxy resin, to a temperature sufficient to react said bislactone with said epoxy resin and to form a copolymer thereof.

3. The copolymer of claim 21, wherein said epoxy resin has the formula:

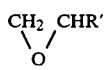

where R' can be any organic radical having one or more epoxy moieties and lacking any other functional group that reacts with the bislactone to be polymerized therewith.

4. The copolymer of claim 3, wherein $R_1$ and $R_2$ can independently be H, halogenated or nonhalogenated alkyl, halogenated or nonhalogenated alkoxy, halogenated or non halogenated aryl, halogenated or nonhalogenated aryloxy, $R_1$ and $R_2$ can combine to form halogenated or nonhalogenated alkylene and, $R_1$ and $R_2$ can combine to form halogenated or nonhalogenated arylene.

5. The process of claim 2, wherein said epoxy resin has the formula:

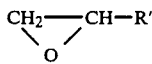

where R' can be any organic radical having one or more epoxy moieties and lacking any other functional group that reacts with the bislactone to be polymerized therewith.

6. The process of claim 5, wherein $R_1$ and $R_2$ can independently be H, halogenated or nonhalogenated alkyl, halogenated or nonhalogenated alkoxy, halogenated or non halogenated aryl, halogenated or nonhalogenated aryloxy, $R_1$ and $R_2$ can combine to form halogenated or nonhalogenated alkylene and, $R_1$ and $R_2$ can combine to form halogenated or nonhalogenated arylene.

7. The process of claim 5, wherein said reaction mixture comprises 1 to 15 percent said bislactone based on the combined weight of said bislactone and said epoxy resin.

8. The process of claim 5, wherein said reaction mixture comprises 4 to 25 percent said bislactone based on the combined weight of said bislactone and said epoxy resin.

9. The process of claim 5, wherein said reaction mixture comprises 13 to 15 percent said bislactone based on the combined weight of said bislactone and said epoxy resin.

10. The process of claim 5, wherein said reaction mixture further comprises a catalytic amount of a tertiary amine.

11. The process of claim 10, wherein said tertiary amine is trisdimethylaminomethyl phenol.

12. The process of claim 5, comprising the steps of:
heating said reaction mixture to about 40° to 70° C.;
placing said reaction mixture within a mold;
heating said reaction mixture within said mold to a temperature of about 90° to 150° C.;
maintaining said reaction mixture within said mold at a temperature of 90° to 150° C. until said reaction mixture solidifies; and
removing said solidified reaction mixture from said mold.

13. The process of claim 12, further comprising the step of postcuring the solidified reaction mixture removed from said mold at a temperature of about 125° to 225° C. for about 4 to 24 hours.

14. The process of claim 13, wherein said postcuring is performed in stages.

15. The process of claim 13, wherein said reaction mixture is maintained in said mold at a temperature of 120° to 130° C. for about 4 to 24 hours.

16. The product of the process of claim 7.

17. The product of the process of claim 13.

18. A bislactone having the following formula:

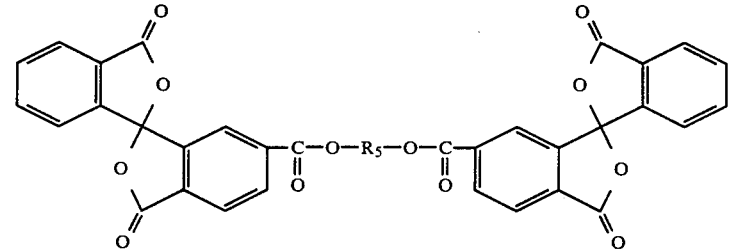

where $R_5$ is a divalent organic radical containing at least one trifluoromethyl group and lacking a functional group, other than one or more bislactone moieties and additionally containing epoxy resin copolymerizable with the bislactone.

* * * * *